US010459416B1

(12) United States Patent
Fernandez

(10) Patent No.: US 10,459,416 B1
(45) Date of Patent: Oct. 29, 2019

(54) ENVIRONMENTAL CONTROL SYSTEM AND REGULATED POWER CONTROLLER FOR SAME

(71) Applicant: Jose M. Fernandez, Sunrise, FL (US)

(72) Inventor: Jose M. Fernandez, Sunrise, FL (US)

( * ) Notice: Subject to any disclaimer, the term of this patent is extended or adjusted under 35 U.S.C. 154(b) by 48 days.

(21) Appl. No.: 15/639,611

(22) Filed: Jun. 30, 2017

(51) Int. Cl.

| | |
|---|---|
| ***G05B 19/042*** | (2006.01) |
| ***H05B 33/08*** | (2006.01) |
| ***H05B 37/02*** | (2006.01) |
| ***A61G 7/018*** | (2006.01) |
| ***E06B 9/36*** | (2006.01) |

(52) U.S. Cl.
CPC ......... *G05B 19/0428* (2013.01); *A61G 7/018* (2013.01); *E06B 9/368* (2013.01); *H05B 33/0863* (2013.01); *H05B 33/0869* (2013.01); *H05B 37/0272* (2013.01); *H05B 37/0281* (2013.01); *G05B 2219/23227* (2013.01)

(58) Field of Classification Search
None
See application file for complete search history.

(56) References Cited

U.S. PATENT DOCUMENTS

2012/0206064 A1* 8/2012 Archenhold ....... H05B 33/0812 315/297
2013/0063042 A1* 3/2013 Bora .................. H05B 33/0863 315/292
2014/0049191 A1* 2/2014 Maxik .................. H05B 33/086 315/307
2018/0082685 A1* 3/2018 Carlin ..................... G10L 15/22

* cited by examiner

*Primary Examiner* — Jimmy T Vu
*Assistant Examiner* — Laura Yesildag
(74) *Attorney, Agent, or Firm* — The Concept Law Group, PA; Scott M. Garrett; Scott D. Smiley

(57) ABSTRACT

Power control for environmental control components (e.g. lighting, blinds, temperature) is controlled and distributed by a regulated power controller in accordance with user preferences and/or a schedule. The outputs of the regulated power controller include at least one regulator capable of a mixed mode output, operable in any of several output modes that can include DC regulation and pulse width modulation, as well as polarity inversion. The centralized control of electrical power facilitates the coordination of environmental control components for holistic control.

17 Claims, 6 Drawing Sheets

234

| LIGHTING CONFIGURATION MENU | | | |
|---|---|---|---|
| OUTPUT 1: | ● BLINDS TURN | ○ BLINDS DRAW | ○ OVERHEAD |
| OUTPUT 2: | ○ BLINDS TURN | ● BLINDS DRAW | ○ OVERHEAD |
| OUTPUT 3: | ○ BLINDS TURN | ○ BLINDS DRAW | ● OVERHEAD |

236

LIGHTING PROFILE MENU

○ CIRCADIAN   ● TIMED

238

TOGGLE SET UP

● LIGHT

○ BED

MAX DURATION

ENVIRONMENTAL CONTROL SYSTEM AND REGULATED POWER CONTROLLER FOR SAME

FIELD OF THE DISCLOSURE

The present disclosure relates generally to environmental control systems, and more particularly to a system that controls several different environmental conditions to support healthy human centric conditions.

BACKGROUND

Many indoor spaces have some elements of environmental or climate control. This is especially true for certain types of indoor spaces, including homes, offices, and healthcare facilities. Typically lighting, either artificial, natural, or both, are used, along with air temperature control are used. These elements are typically independent of each other, meaning they are operated and controlled separately. Even among elements that control a similar environmental condition, such as blinds over a window of a room and light bulbs in the room; both can control light in the room to different effect, and operating one does not change the other. Likewise, controlling the room light is performed independently of controlling temperature in the room, and typically the control of natural light, via blinds or curtains, is controlled separately from the artificial light in the room. In a similar matter air quality is also typically independently controlled. Even when they are remotely controlled, they are controlled separately.

In many settings, it is desirable to temporarily adjust the environmental conditions. For example, in a healthcare environment, such as a hospital room, a patient may have the lighting adjusted to a preferred level. However, when a care provider (e.g. doctor, nurse) needs to examine the patient, or apply a treatment, the care provider may desire to adjust the lighting level to a brighter condition. Adjusting the lighting level typically requires a manual operation (e.g. changing a switch, or adjusting a dimmer), as does changing the level back when the care provider is done. Likewise, opening and closing window blinds are also typically manual operations. There are other conditions such as safety and specialized condition based on location which tie into the location of the patient within the building as well as specialized equipment requiring one's ability to locate the equipment and/or patient.

Accordingly, there is a need for a method and apparatus for controlling the environmental conditions in an indoor space under a centralized control, and such that it can be momentarily adjusted and revert back to the preferred settings based on a location of a patient, equipment, or both.

BRIEF DESCRIPTION OF THE FIGURES

In the accompanying figures like reference numerals refer to identical or functionally similar elements throughout the separate views, together with the detailed description below, and are incorporated in and form part of the specification to further illustrate embodiments of concepts that include the claimed invention and explain various principles and advantages of those embodiments.

Figure 1:
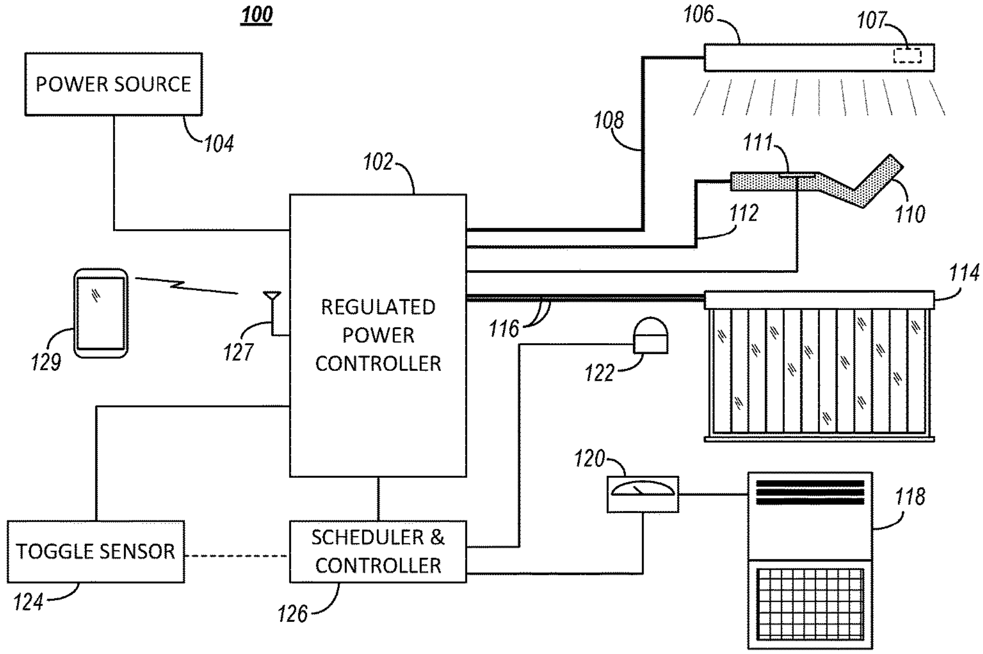
FIG. 1 is a system diagram of an environmental control system, in accordance with some embodiments.

Those skilled in the field of the present disclosure will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein. The details of well-known elements, structure, or processes that would be necessary to practice the embodiments, and that would be well known to those of skill in the art, are not necessarily shown and should be assumed to be present unless otherwise indicated.

DETAILED DESCRIPTION

Embodiments of the disclosure include an environmental control system that includes a regulated power controller that has a power input for receiving electrical power input from a power source. The regulated power controller further includes a plurality of power regulators that each provide a respective regulated electrical output to a respective one of a plurality of environmental control components. Each of the plurality of environmental control components control a respective unique environmental condition. Among the plurality of power regulators there are at least two that regulate differing electrical parameters at their respective regulated outputs to control their respective environmental control components according to a schedule. The system also includes a toggle sensor that produces a toggle output that can be coupled to a toggle input of the regulated power controller, and which provides the toggle signal to the regulated power controller in response to an input received at the toggle sensor. In response to receiving the toggle signal, the regulated power controller adjusts at least one of the plurality of environmental control components between a preferred, user adjustable setting and a preselected setting.

FIG. 1 is a system diagram of an environmental control system 100, in accordance with some embodiments. The environmental control system 100 is suited for use in an enclosed indoor area, such as a room (e.g. in healthcare facilities), and it facilitates the control of environmental conditions including light levels and temperature, among other factors. Of course all of these environmental factors have been controllable for a very long time using well known equipment. However, they have not been coordinated in a holistic way before due to the lack of components that facilitate the provisioning and coordination of environmental controls.

The invention of the disclosed embodiments herein comprises a regulated power controller 102 that receives power from a power source 104, typically in the form of alternating current (AC), and converts it to direct current controlled power signals or other control signals at several regulated outputs. In some embodiments the power source 104 can be a power over Ethernet (POE) power source where an AC power signal is provided over an Ethernet networking cable that is terminated with RJ-45 connectors, as is well known (see, e.g., IEEE 802.3 publication). POE has the advantage of being able to provide power over cabling at a lower voltage than commercial AC service, and is therefore not subject to the same regulations with regard to installation.

The outputs of the regulated power controller 102 are mixed mode, meaning among the outputs are several having a different electrical parameter being regulated (e.g. voltage, or current, or other). The regulated outputs are used to control several environmental control components, such as artificial lighting 106, a bed 110, and window blinds 114. The system 100 can further include and control a heating/cooling unit 118.

The artificial lighting is powered by the regulated power controller 102 via a first output 108, which includes two conductors for conducting current to and from lighting elements in one or more lighting fixtures. For example, the artificial lighting 106 can be comprised of one or more light emitting diode (LED) fixtures, and the output 108 can be a regulated DC current that is regulated at a specified level to produce a selected light output level, as well as light color temperature, which can be detected by a light sensor 122 that provides feedback. The artificial lighting can have an associated transceiver 107 that includes an identifier (e.g. a media access control identifier). The transceiver 107 can be used to associate the artificial lighting 106 with a specific location (e.g. a room), and it can be used to communicate with other devices/networks.

A bed 110 can be an articulating bed that can raise or lower portions in accordance with and responsive to control input provided by a second output 112 of the regulated power controller 102. Thus, the head and upper body portion of the bed 110 can be raised or lowered by the signals provided by the second output 112. The bed 110 can include a heating component 111 to provide heat to a person using the bed 110. In some embodiments the temperature of the bed can be regulated in correspondence with the time of day, or with a person's activity, for circadian rhythm.

The window blinds 114 can controllable in multiple ways. For example, in window blinds that have slat elements, the slats can be turned to open or close them collectively, allowing in, or shutting out light to varying degrees. Furthermore, the slat elements can be drawn open to completely remove them from most of the window, and likewise they can be closed to cover most of part of the window. Accordingly the window blinds 114 can use a pair of outputs 116 of the regulated power controller 102 for driving different motors to operate different types of motion of the window blinds 114. The light sensor 122 can be used to sense the total light, which can be used as a feedback control to adjust the artificial light output as daylight through the window changes to maintain a minimum desired light level.

An interface such a scheduler 126 is configured to receive user input and display various settings for controlling the outputs of the regulated power controller 102, and can be connected to the regulated power controller 102 via a common wiring interface such as an network or bus connection. The scheduler can allow a user to set environmental preferences, including, for example, a lighting profile that controls the total light in the room over time, as well as the temperature. Lighting is controlled by the regulated power controller providing power and other outputs to the blinds 114 and the artificial lighting 106, and sensed via the light sensor 122, which is shown connected to the scheduler 126 but can also be connected to the regulated power controller 102 for more direct feedback operation. Temperature can be controlled by adjusting the thermostat 120 that controls the heating/cooling unit 118.

An alternative to the scheduler 126 can be provided in the form of a wireless interface. For example, the regulated power controller 102 can include a wireless radio transceiver that uses an antenna 127 to communicate with a device 129, such as a cellular phone device or other wirelessly enabled computing device. It is well known to use wireless local and personal area networking protocols for such communication as indicated in, for example specifications 802.11 and 802.15 of the Institute of Electrical and Electronics Engineers (IEEE). The device 129 can use a generic computing environment in which application programs can be run, using the hardware and other resources of the device 129. Accordingly, and application program run on the device can allow a user to interact with, and control settings that control the outputs of the regulated power controller in the same way and the scheduler 126.

In certain applications, it may be desirable to temporarily depart form the preferred environmental setting, particularly with regard to light, so as to allow, for example, a care provider to perform a task related to a patient. To allow for the easy control of an environmental condition for a temporary change, a toggle sensor 124 is connected to the regulated power controller 102, and provides a toggle signal in response to the toggle sensor being operated or actuated. The toggle signal can be, for example, a momentary change in an electrical parameter provided by the toggle sensor 124 to the regulated power controller 102. The regulated power sensor 102 can be configured to change one or more outputs from a preferred setting at a given time (the time when the toggle sensor is activated) to a preselected output. Accordingly, for example, the toggle sensor 124 and regulated power controller 102 can be configured to change the output of the artificial light 106 from an off level to a lit state that can vary depending on the time of day. Thus, if, for example, a caretaker needs to examine a patient in a room whose environment is controlled by the system 100, the caretaker can operate the toggle sensor upon entering the room. In response, the regulated power controller 102 can adjust its output 108 to change the light level output of artificial light 106 from a low or off level to a level suited for a visual examination. At night time, the blinds 114 do not need to be operated for more light as there is no natural light available that can come through the window. Once the caretaker is finished, as the caretaker leaves the room the caretaker can again activate the toggle sensor 124, causing the regulated power controller 102 to again receive the toggle signal, and in response reset the environmental control component it adjusted back to a preferred setting. The preferred setting can be based on a preferred time profile and the present time of day. The toggle sensor 124 can be, in some embodiments, a switch, much like a power switch (e.g. a light switch), but wired for a low level DC signal to the regulated power controller 102. In some embodiments the toggle sensor can be a near field sensor having a more secure design (compared to a switch) using near field communication, such as a card reader, a barcode reader, a radio frequency identification reader, and so on, to ensure that only authorized personnel are able to operate the toggle sensor 124.

Accordingly, the regulated power controller 102 facilitates the operation of several different environmental control components that have different power and control requirements by providing a plurality of mixed mode outputs that can be configured to operate each of the environmental control components in a preferred way, which can be automated and controlled over time according to a preferred time profile that is set at an interfacing device such as a scheduler 126 or a connected device 129. Furthermore, the environmental conditions can be changed from a preferred state to a state more conducive for a temporary activity, and then reverted back to the preferred state once the temporary activity is completed using the toggle sensor 124.

Figure 2:
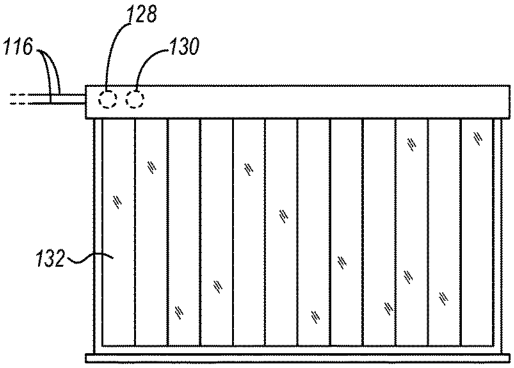
FIG. 2 shows a window with blinds in a closed position, as controlled by an environmental control system in accordance with some embodiments.

FIGS. 2-5 show various exemplary states of a blind system as an environmental control component. The blind system being exemplified can be similar to blind 116 of FIG. 1. FIG. 2 shows a window with blinds in a closed position, as controlled by an environmental control system in accordance with some embodiments. The blind includes a plurality of slat components 132. As shown here the blind is a vertical blind because the slats 132 hang vertically and are operated around a vertical axis, however those skilled in the art will appreciate that horizontal blinds can be operated equivalently in accordance with the teachings herein. Two different outputs 116 from a regulated power converter (e.g. 102) are each respectively provided to motors 128, 130. Motor 128 operates the rotation of slats 132, while motor 130 operates the drawing of the slats 132. As shown in FIG. 2, the slats 132 are rotated to cover the window (behind the slats) and are drawn closed, meaning across the entirety of the window. Accordingly, most natural light that would be available through the window is blocked by the blind in FIG. 2.

Figure 3:
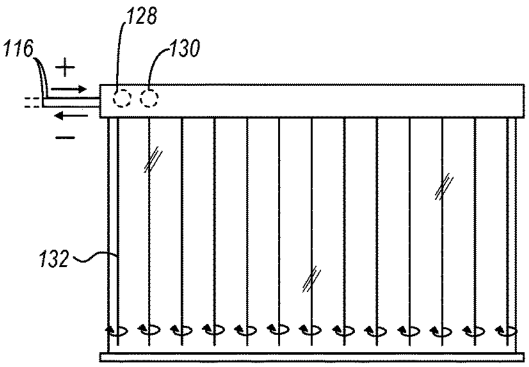
FIG. 3 shows a window with blinds in an open position, as controlled by an environmental control system in accordance with some embodiments.
Figure 4:
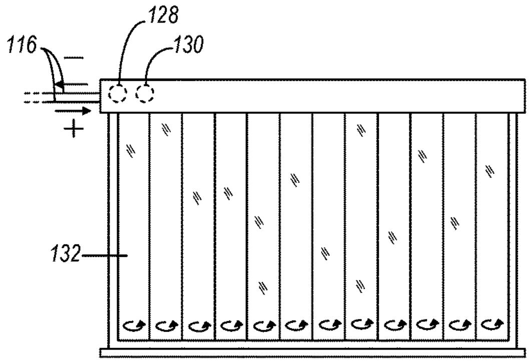
FIG. 4 shows a window with blinds in a re-closed position, as controlled by an environmental control system in accordance with some embodiments.
Figure 5:
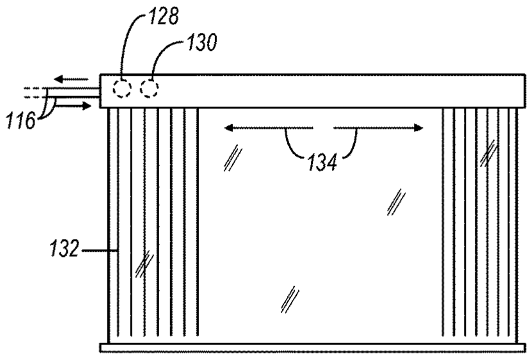
FIG. 5 shows a window with blinds in a drawn position, as controlled by an environmental control system in accordance with some embodiments.

In FIG. 3 the slats 132 are rotated approximately 90 degrees to allow light most natural light available at the window to pass into the room. To cause the slats 132 to rotate, motor 128 is operated by one of the output 116 of the regulated power converter using an appropriate electrical polarity. In FIG. 4, the polarity of the output 116 to motor 128 is reversed by the regulated power controller, causing the slats 132 to rotate back to the position shown in FIG. 2. The polarity in FIGS. 3 & 4 is indicated by the arrows and the "+" and "−" symbols shown in proximity to the lines representing the outputs 116. In FIG. 5, the slats are drawn shown drawn open to allow the most natural light possible into the room. To draw the slats open, the slats 132 must first be rotated to the position shown in FIG. 3 using motor 128, then motor 130 is operated to drawn the slats 132 on the left side to the left, and the slats 132 on the right side to the right, as indicated by arrows 134, and as is known for vertical blinds using manual drawstring operation. In some embodiments all of the slats 132 can be moved to either the right or the left, rather than splitting them into to groups as shown. Accordingly, the regulated power controller, must operate both motors 128 and 130 in a specific sequence to move the slats from a completely closed position to a completely open position. To close the blind the sequence, and polarity of the outputs 116, are reversed accordingly.

Figure 6:
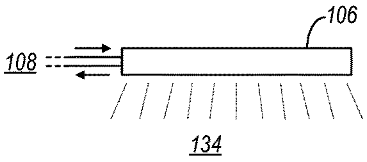
FIG. 6 shows an overhead artificial light outputting light at a first level, as controlled by an environmental control system in accordance with some embodiments.
Figure 7:
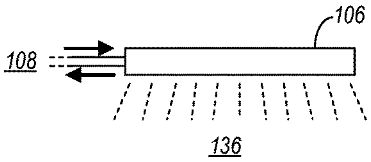
FIG. 7 shows an overhead artificial light outputting light at a second level, as controlled by an environmental control system in accordance with some embodiments.

FIGS. 6 and 7 show an overhead artificial light outputting light at first and second levels, respectively, as controlled by an environmental control system in accordance with some embodiments. Output 108, provided by a regulated power controller (e.g. 102) provides electrical current to an artificial lighting fixture 106, such as an LED lighting fixture. In FIG. 6 a low current is applied, resulting in a low light output level 134 of the artificial light 106. In FIG. 7 more current is provided by output 108, and a higher level of light 136 is output by the artificial light 106. Accordingly, output 108 only needs to change in magnitude, not polarity.

Figure 8:
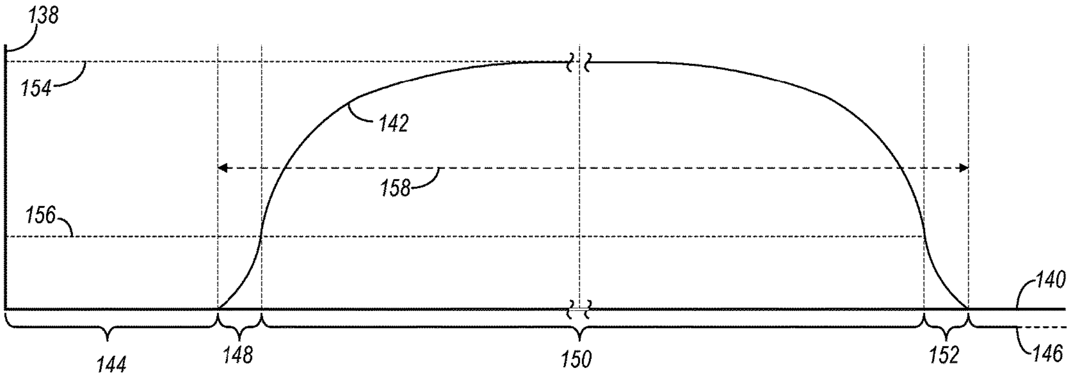
FIG. 8 shows a graph diagram of total light in an environment, as controlled by an environmental control system in accordance with some embodiments.

FIG. 8 shows a graph diagram of total light in an environment, as controlled by an environmental control system in accordance with some embodiments. The vertical axis 138 represents light intensity as measured at, for example, a light sensor (e.g. 122) in the environment. The horizontal axis 140 represents time throughout a single day (e.g. a 24 hour cycle that is to be repeated). A preferred total light profile level 142 is a plot of the desired or preferred total light in the environment over time. The plot can be set or selected by a user via an input (e.g. 126 or 129). In some embodiments a user can select specific levels at different times, and natural profiles can be provided to simulate natural daylight in an outdoor setting over the course of day to facilitate circadian rhythm and prohibit issues such as seasonal affective disorder. Accordingly, a typical profile can include periods of darkness 144, 146 of very little to no light. The lighting can be controlled to simulate a pre-sunrise twilight during time 148 as the regulated power controller increases the total light in the environment from darkness up to a maximum level 154. Similarly, towards the end of the day the light level can be reduced from a maximum level down to the sunset level, and further during a post-sunset twilight time 152. The simulated sunrise/sunset light level 156, along with the steepness at which the light level increases or decreases can be selected based on geographic factors to simulate natural light at the geographic location of the environment, or any other geographic location. Likewise, the duration of the daytime period 150, as well as the total light period 158 can be selected and/or adjusted to user preferences. Room temperature, and temperature of the bed can also be controlled or adjusted by the user, as well as in correspondence with the time of day.

Figure 9:
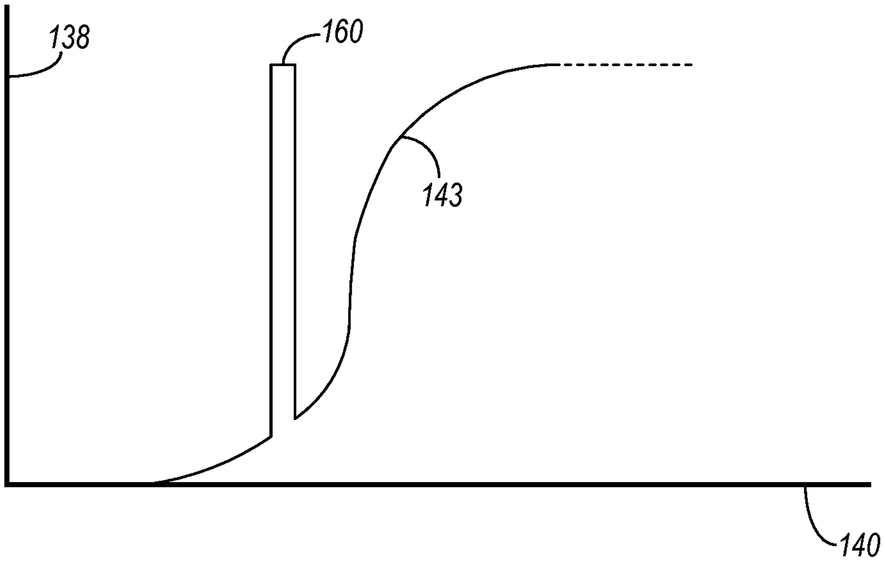
FIG. 9 shows a graph diagram of total light in an environment including a temporary toggle of light output, as controlled by an environmental control system in accordance with some embodiments.

FIG. 9 shows a graph diagram of total light in an environment including a temporary toggle of light output, as controlled by an environmental control system in accordance with some embodiments. Plot 143 represents the light actually sensed in the environment using a profile such as that represented by plot 142 in FIG. 8. As can be seen, the plot 143 mostly follows the profile plot 142, with the exception of an excursion 160. The excursion represents a period where a toggle sensor (e.g. 124) in the environment was activated twice to start and cease the excursion 160. Thus, when the toggle sensor is first activated, the light level increases instantly or near-instantly at a leftmost edge of the excursion to a preselected level. The preselected level can be adjusted based on the time of day in some embodiments. When the toggle sensor is then again activated, the light level is reduced back to that of the profile plot 142 at the rightmost edge of excursion 160. The total light level can be adjusted by adjusting the output of the artificial light, as well as by controlling the amount of natural light admitted by the window blind, depending on the time of day. Similarly, room temperature can also be controlled in correspondence with the time of day. The operation of the artificial light and the blind is controlled by the regulated power controller in response to the toggle signal provided by the toggle sensor, as well as by the preferred lighting profile. Similarly, or in addition, the position of a bed can be adjusted according to a profile, with changes/excursions from the selected profile for brief periods of time. Furthermore, the various environmental control components can each have a separate profile; meaning that, for example, light level and bed position can be controlled independent of each other, and both can be subject to simultaneous or independent excursions in response to the toggle sensor being activated.

Figure 10:
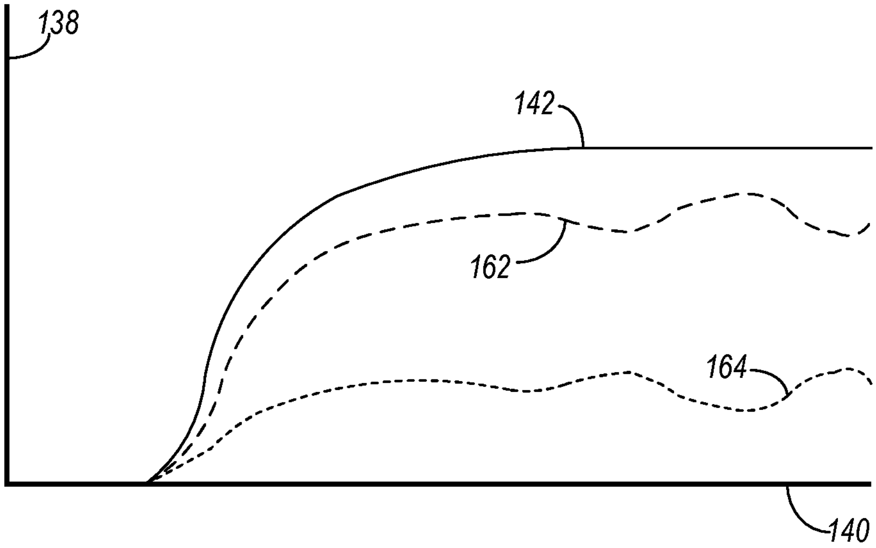
FIG. 10 shows a graph diagram of total light output, and the contributions from natural light and artificial light, as controlled by an environmental control system in accordance with some embodiments.

FIG. 10 shows a graph diagram of total light output, and the contributions from natural light and artificial light, as controlled by an environmental control system in accordance with some embodiments. The profile plot 142 represents the total desired light level, but that does not mean all of the light must come from one source. In situations where natural light through a window can be utilized, artificial light can be used to supplement the natural light to achieve the desired total light. Graph plot line 164 represents the natural light component and graph plot line 162 represents the controlled artificial light component of the total light in an environment. The natural light indicates some variability due to movement of the sun across the sky and the effect of clouds. The total light can be sensed by a light sensor, and the output of the light sensor can be used to adjust the electrical power output to an artificial light fixture in the environment to supplement the natural light and achieve the desired total light according to the profile plot 142.

Figure 11A:
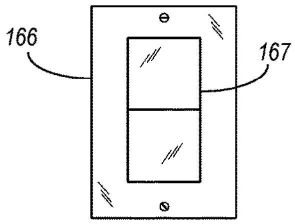
FIG. 11A shows an example of a toggle sensor device in a switch configuration for use with an environmental control system, in accordance with some embodiments.

FIG. 11A shows an example of a toggle device in a switch configuration for use with an environmental control system, in accordance with some embodiments. The toggle sensor shown here utilizes the familiar configuration of a light switch that can be wall mounted, for example, near an entrance to the environment. A wall plate 166 frames a switch element 167 such as a rocker switch element, or a slide element. In some embodiments a single button can be used that toggles between an "in" and an "out" position or setting. In some embodiments the toggle switch can be a touch sensor that produces a toggle signal in response to being touched or momentarily pressed. Unlike a standard light switch, however, the toggle switch does not control the flow of commercial service AC electrical power. Rather, the toggle switch can produce the toggle signal at a relatively low DC level. In some embodiments, the toggle switch can be connected to the regulated power converter by an Ethernet cable connection.

Figure 11B:
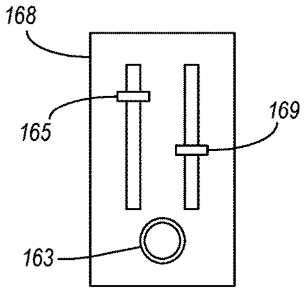
FIG. 11B shows an example of a slide panel for controlling light quality of an artificial light in an environmental control system, in accordance with some embodiments.

FIG. 11B shows an example of a slide panel for controlling light quality of an artificial light in an environmental control system, in accordance with some embodiments. Two significant qualities to light are intensity and color. Both of these qualities are believed to have significant effect on a person's mood and psychological state, and so controlling those qualities in conformance with circadian rhythm cycles (i.e. according to a circadian rhythm profile) is likewise believed to be beneficial for people. Accordingly, a toggle sensor 168 can include several slider elements 165, 169. The toggle sensor 168 can be a wall-mounted component and operate as a toggle sensor such as toggle sensor 124 in FIG. 1. Accordingly toggle sensor 168 can be operably connected to a regulated power controller (via wiring or wirelessly) that provides power to, among other components, an artificial light source. Slider element 165 can be used to electrically control brightness or light intensity of the light source, as measured, for example, in lumens. Slider element 169 can be used to control the color temperature of the lighting, when used with lighting systems of bulbs that can change or adjust their color temperature. Specifically, sliders 165, 169 can vary the magnitude of an electrical parameter (e.g. a DC voltage level) provided to the regulated power controller, which causes the regulated power controller to adjust its output to the light source accordingly. These inputs to the regulated power source, intensity as controlled by slider 165 and color temperature as controlled by slider 169, can set user preferences, or maximum levels when the lighting output is automatically and dynamically adjusted in correspondence with the time of day for circadian rhythm. However, these can be overridden by a toggle switch 163. By pressing or otherwise activing the toggle switch 163 the light output is toggled by the regulated power controller between the user preferences set by sliders 165, 169 and a preselected output (e.g. a maximum flux or intensity). The preselected output can be, for example, an output level to facilitate examination of a patient, for example. The light output can revert back to the user preferred level set by sliders 165, 169 by again actuating toggle switch 163, or upon expiration of a time out period. Like the sliders 165, 169, the toggle switch 163 can change the state of a signal, or provide a signal to the regulated power controller, and the regulated power controller can be configured to toggle its output to the light component accordingly. The signal from the toggle switch 163 to the regulated power controller can be transmitted via wire(s), or wirelessly by a wireless transceiver of toggle sensor 168.

In addition to the wall mounted toggle sensors, it is further contemplated that toggling can be performed via a wirelessly enabled device, such as a tablet computing device. For example, a menu of room, listed by room number, can be displayed by an application executing on the device, where the room numbers are obtained by scanning for beacons that transmit from one or more devices in the rooms, or by location (e.g. GPS location), and cross referencing identifiers or location with rooms in the vicinity. The user can select the appropriate room, and thereafter be presented with a control interface to toggle or adjust environmental control components, including lighting components via a wireless device to device interface, or through a server network.

It is further contemplated that the toggle sensor, as a near field sensor, can read or communicate in other ways. For example, in a hospital or similar setting, patients can wear wrist bands that identify the patient. An environmental control profile, such as a circadian rhythm profile, can be associated with the patient as a preference for environmental controls. Upon entering a room, the patient's wrist band can be read by the toggle sensor and confirmed by an authorized member. The information can then be used to, for example, populate a database record associated with the room, indicating the patient's identification information, their preferred, or a default environmental control profile, medical prescriptions, and so on.

Figure 12:
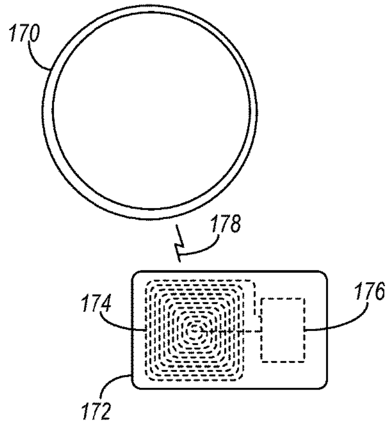
FIG. 12 shows an example of a toggle device in an RFID reader configuration for use with an environmental control system, in accordance with some embodiments.

FIG. 12 shows an example of a toggle sensor in an RFID reader configuration for use with an environmental control system, in accordance with some embodiments. A RFID reader 170 can, like the toggle switch of FIG. 11, be mounted on a wall near an entrance to an environment. When a person who needs to temporarily adjust the environmental conditions enters the environment, a RFID card 172 or other RFID-enable object can be passed in front of the RFID reader 170. The RFID reader 170 emits a radio signal that energizes the RFID card via a coil 174. A RFID circuit 176 that is powered by energy captured by the coil 174 uses the coil 174 to transmit an identifier (e.g. a unique digital sequence) to the RFID reader 170. The RFID reader can be connected to a secure network to determine whether the received identifier is authorized to adjust environmental conditions, and if so, then the RFID reader can transmit a toggle signal to the regulated power controller. The RFID card 172 can then again be read by the RFID reader 170 as the authorized user leaves the environment to revert the environmental conditions to the preferred levels. Alternatively, a second person using a different RFID card (or object) who is also authorized can then use their RFID card to reset the environmental conditions. That is, the RFID reader can produce a toggle signal every time an authorized identifier is received. The identifiers received at the RFID reader can be logged by recording the identifier and the time at which the identifier was received at the RFID reader, in association with the location of the RFID reader. The records can allow tracking of personnel from location to location to ensure that, for example, people in different rooms have been attended to for care or other procedures. As with the switch embodiment of FIG. 11, the RFID reader 170 does not need commercial AC service, and can be powered over a network connection between the RFID reader and the regulated power controller. In addition to RFID, other forms of near field communication can be used. such as those known commercially as ZigBee™ and BlueTooth™.

Figure 13:
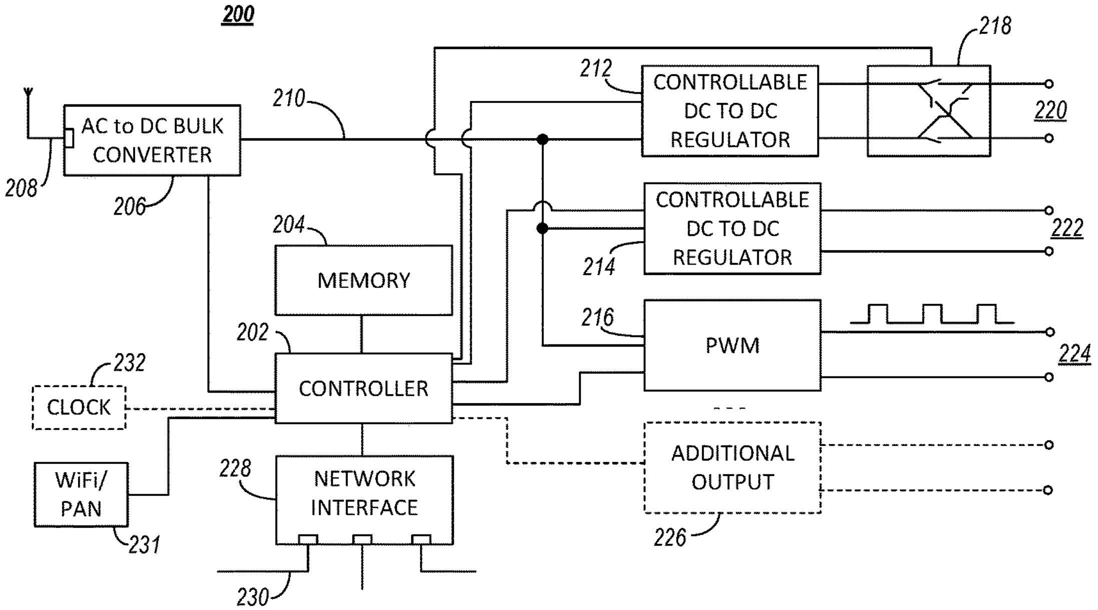
FIG. 13 shows a schematic block diagram of a regulated power controller having mixed mode outputs, in accordance with some embodiments.

FIG. 13 shows a schematic block diagram of a regulated power controller 200 having mixed mode outputs, in accordance with some embodiments. The regulated power controller 200 can be an example of an embodiment of the regulated power controller 102 of FIG. 1. The regulated power controller 200 can include a controller 202 which can comprise a microprocessor or microcontroller and associated circuitry. The controller 202 is coupled to memory 204 which can be an aggregate of memory types, including read only memory (ROM), random access memory (RAM) or other byte-addressable memory, and other forms of volatile and non-volatile memory. The memory can store instruction code and provide memory space for instantiating the instruction code for execution by the controller 202. The instruction code is configured to cause the controller 202 to perform functions and tasks in accordance with the disclosure herein, and in general the controller controls the operation of several power regulators that each output electrical power which can be used to control the operation of environmental control components (e.g. blinds, lights, etc.).

Power is provided via a power input 208, which can be a POE input in some embodiments. The input power received at input 208 is typically in an AC form, but not necessarily at commercial AC service configuration (e.g. 120 VAC at 60 Hz sinusoidal). The input power is converted to a DC form by a AC to DC converter 206 to provide a DC output 210 to several output regulators 212, 214, 216. Each of the output regulators 212, 214, 216 are responsive to the controller 202 by respective control signals. There are at least two different types of output regulators which are power regulators. For example regulator 212 can be a voltage DC to DC regulator that provides a regulated DC voltage at output 220, regulator 214 can be a current mode regulator that provides a regulated current at output 222, and regulator 216 can provide a pulse width modulated (PWM) signal at output 224. Furthermore, any of the outputs 220, 222 can be inverted with regard to polarity by use of an polarity inverting bridge 218 that can reconfigure the electrical paths between the output 220 and the regulator 212 using a set of four switches, one of each line for a straight through path, and one for each line for a crossover path.

Regulators such as regulator 212 and the polarity inverting bridge 218 can be used for components like blind motors (e.g. 128, 130), or bed motors that operate in two directions to change the position of things. Regulator 214, which regulates a current output, can be used, for example, to control the light output of a LED lighting component. A PWM signal such as that output by regulator 216 at output 224 can be used to control or regulate other components. Additional outputs 226, including optical and acoustic outputs can be employed as well. In some embodiments the regulators 212, 214, 216 can be half bridge DC to DC regulators. As such, they can each be controlled to perform DC regulation, pulse width modulation, and polarity inversion.

The controller can be further coupled to one or more network interfaces such as network interface 228 that can support network connectivity to other system components, such as a toggle sensor (e.g. 124), or a scheduler interface (e.g. 126), as well as with a system network. The regulated power controller 200 can further include a wireless network interface 231 that includes a radio transceiver operated in accordance with a wireless networking protocol (e.g. IEEE 802.11/802.15). The wireless network interface can provide wireless connectivity with a mobile device to facilitate the input and adjustment of control settings and values. Finally, a clock 232 can be used to track time, and time of day, for adjusting the environmental components in accordance with their preferred settings over the course of a day (e.g. in compliance with a time profile). Thus, the regulated power controller 200 is configured to output power to various environmental control components using a plurality of power output regulation schemes, including the ability to reverse or invert the polarity of one or more outputs to reverse the action of a motor, for example, of a given environmental control component.

Figure 14:
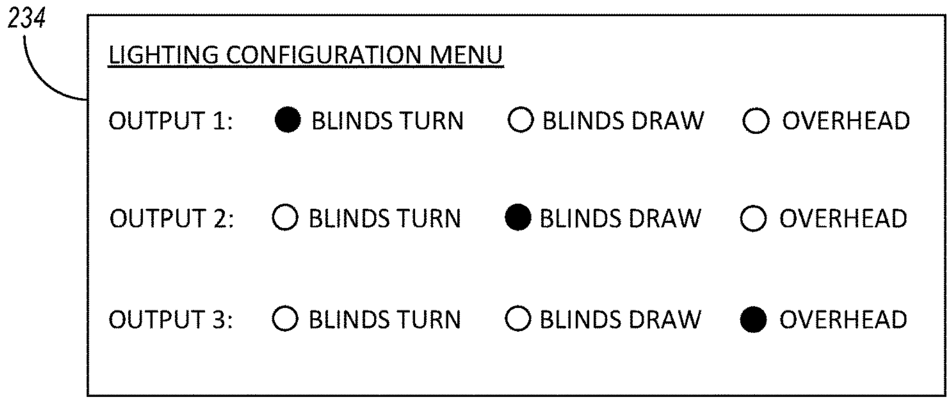
FIG. 14 show an exemplary interface diagram of an interface for configuring outputs of a regulated power controller, in accordance with some embodiments.
Figure 15:
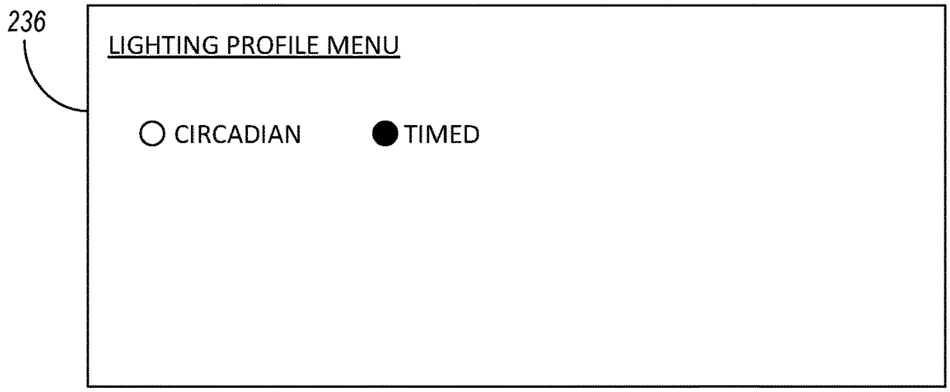
FIG. 15 shows an exemplary interface diagram of an interface for configuring a total light output profile, in accordance with some embodiments.
Figure 16:
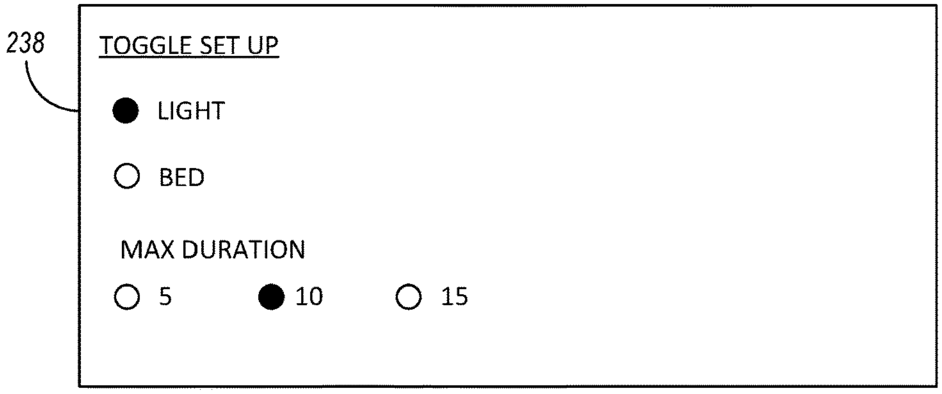
FIG. 16 shows an exemplary interface diagram of an interface for configuring toggle operation of an environmental control system, in accordance with some embodiments.

FIGS. 14-16 show various examples of an interface configuring outputs of a regulated power controller, in accordance with some embodiments. The interfaces 234, 236, 238 can be provided on a locally wired scheduler component (e.g. 126). They can also represent interfaces displayed on various menus pages of an application or web browser page for controlling the regulated power controller at a computer or mobile device.

In interface 234 an interface is provided to allow a user to provision the outputs of the regulate power controller. For example a first output, "output 1," can be provisioned to control the turning if slats in a window blind. Thus, when the regulated power controller executes instruction code for controlling the rotation of blind slats, it will control the output corresponding to "output 1." Similarly, "output 2" is set up as an output that controls the drawing (opening/closing) of the blinds, and "output 3" is set up as overhead lighting. Interface 236, which can be a sub-menu interface brought up for "output 3," allows a user to select a general lighting profile. In the example interface 236 the user can select among a circadian profile and a timed profile. The circadian profile simulates a natural daylight pattern where there is little to no light during a night portion, then the light is gradually increased during a simulated sunrise period that includes a pre-sunrise twilight. The light is then quickly increased to near a full level, and the processed is reversed for a simulated sunset and post-sunset twilight period. The timed profile can simply set a turn on and turn off time. Interface 238 is an example of a toggle set up menu which allows the user to select which environmental control components are affected by the toggle signal, as well as a maximum duration for the toggle effect. In the example of interface 238 the user can select the light level, bed position, or both, to be affected by the toggle input. The selection of "light" or "bed" can bring up a sub-menu for selecting or setting preferences related to each of those environmental control components. For example, and light sub-menu can allow a user to set a light level, or a light differential, or both. Once the various outputs have been configured, then the regulated power controller will automatically control and adjust the environmental control components connected to the corresponding outputs of the regulated power controller. Upon receiving a toggle signal, the environmental control components provisioned for toggle effect and then changed temporarily until another toggle signal is received or a maximum duration timer expires.

Figure 17:
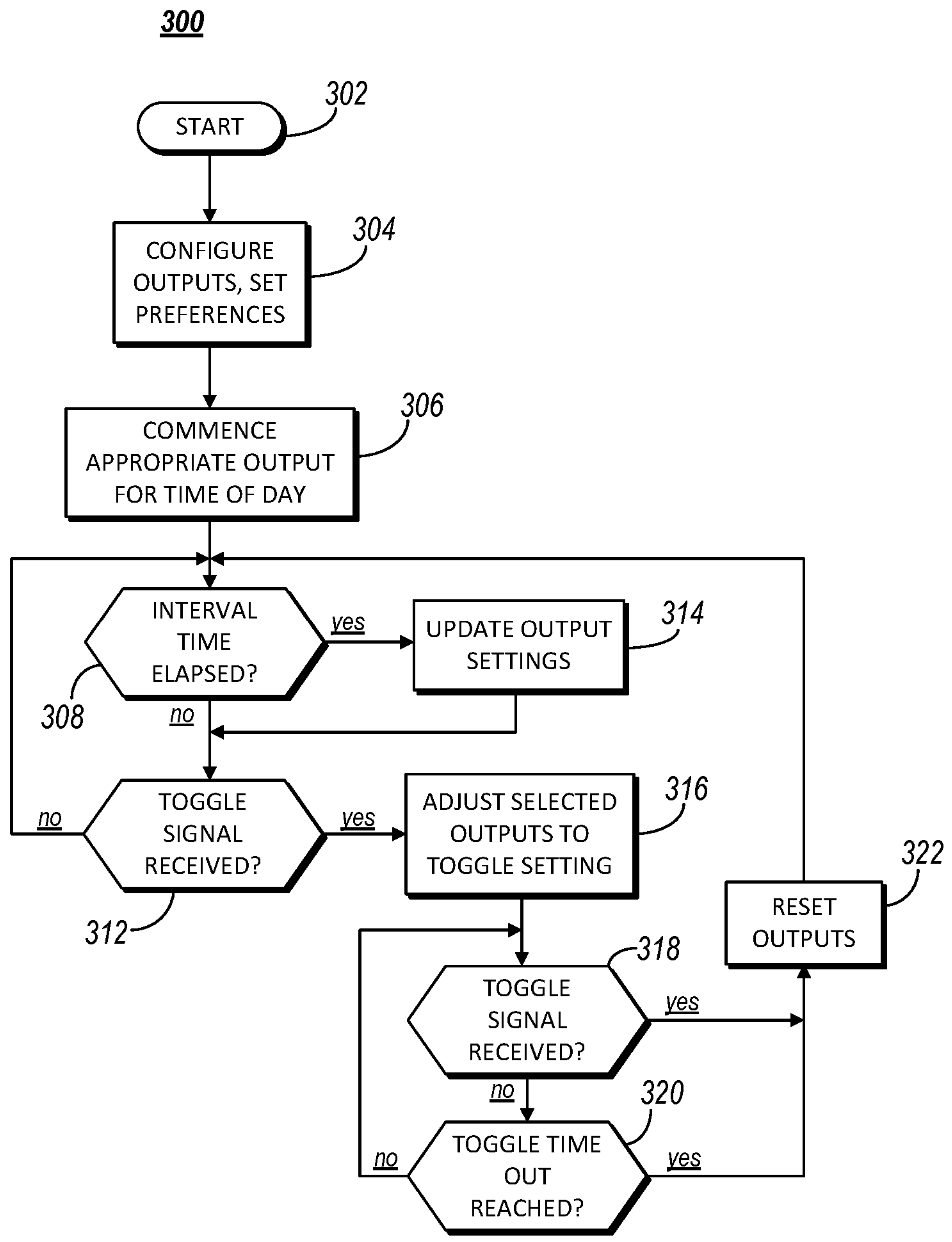
FIG. 17 is a flow chart diagram of a method for operating an environmental control system, in accordance with some embodiments.

FIG. 17 is a flow chart diagram of a method 300 for operating an environmental control system, in accordance with some embodiments. At the start 302, the regulated power controller and environmental control components are set up and connected, and power is provided to the regulated power controller. At step 304 the regulated power controller is provisioned, where the outputs are mapped or set to a corresponding environmental control component, either through a menu interface or simply by hardwiring. At step 306 the regulated power controller commences providing outputs at the appropriate level for the present time of day. For example, window blinds can be opened or closed, and to varying degrees; overhead lighting output can be adjusted to augment to natural light to a desired total light level, a bed position can be adjusted to a preferred position, and so on. In step 308, the method 300 determines whether it is time to adjust any outputs based on an interval timer. For example, the regulated power controller can make adjustments every minute, every five minutes, or more, or less. If it is time to make an adjustment, then the method 300 proceeds to step 314 where the appropriate outputs are adjusted. In step 312 the method 300 can determine if a toggle signal has been received. Alternatively, the toggle signal can operate as an interrupt at any point during steps 308, 314. When a toggle signal is received, then the regulated power controller adjusts one or more environmental control components in step 316 to their toggle levels. The method 300 then waits to receive another toggle signal, or for a maximum toggle time to elapse, in steps 318, 320. When either of those things happen, the method 300 proceeds to step 322 where the toggled environmental parameters are reset approximately to what they were in just prior to performing step 316, and the method then continues on by looping back to step 308.

The embodiments of the disclosure provide several benefits over the prior art, including the centralizing of power control in a regulated power controller for an environmental control system. The regulated power controller is capable of providing mixed mode output to regulate in any of several modes to control motors, lighting, and other environmental control elements. Thus, different environmental control components do not each need their own separate power supplies/regulators, which increases the complexity of installation and control of the various environmental control components.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description as part of the original disclosure, and remain so even if cancelled from the claims during prosecution of the application, with each claim standing on its own as a separately claimed subject matter. Furthermore, subject matter not shown should not be assumed to be necessarily present, and that in some instances it may become necessary to define the claims by use of negative limitations, which are supported herein by merely not showing the subject matter disclaimed in such negative limitations.

I claim:

1. An environmental control system, comprising:

a regulated power controller having a power input for receiving electrical power input from a power source, a plurality of power regulators that each provide a respective regulated electrical output to a respective one of a plurality of environmental control components, wherein each of the plurality of environmental control components control a respective unique environmental condition, wherein among the plurality of power regulators there are at least two that regulate their respective regulated outputs according to a schedule of a profile indicating a preferred setting that varies based on a time of day; and a toggle sensor having a toggle output coupled to a toggle input of the regulated power controller and which provides a toggle signal to the regulated power controller in response to a user input received at the toggle sensor;

wherein, in response to receiving the toggle signal, the regulated power controller is configured to change the regulated output of one of the at least two power regulators that regulate their respective outputs according to the schedule from the preferred setting according to the schedule to a preselected output, and wherein the regulated power controller is further configured to revert the regulated output of the at least one of the at least two power regulators from the preselected output to the preferred setting according to the schedule upon again receiving the toggle signal, and the regulated power controller is further configured to revert the regulated output of the at least one of the at least two power regulators from the preselected output to the preferred setting according to the schedule upon expiration of a time out period if the toggle signal is not again received before expiration of the timeout period.

2. The environmental control system of claim 1, wherein the power input is configured as a power over Ethernet input.

3. The environmental control system of claim 1, wherein the plurality of environmental control components includes an adjustable artificial lighting component, and wherein the regulated electrical output provided by the regulated power controller to the adjustable artificial lighting component is configured to adjust an electrical current as the regulated electrical output in correspondence with a user input selection to adjust a light output of the adjustable artificial lighting component.

4. The environmental control system of claim 3, wherein, in response to the toggle signal, the regulated power controller temporarily changes the electrical current between a current for a preselected light output level and a current for a scheduled light output level.

5. The environmental control system of claim 1, wherein the toggle sensor is a two position wall-mounted switch having a first position for the preferred setting according to the schedule and a second position for the preselected output.

6. The environmental control system of claim 1, wherein the toggle sensor comprises a near field wireless sensor.

7. The environmental control system of claim 1, wherein the regulated power controller is operable to control each of the environmental control components in accordance with a circadian rhythm profile.

8. The environmental control system of claim 1, wherein, regulated power controller has at least one output that is selectably operable to regulate either a direct current (DC) level output or a pulse width modulation duty cycle output, as selected by a controller of the regulated power controller.

9. A regulated power controller for an environmental control system, comprising:

a power input for receiving electrical power input from a power source;

a control circuit;

a plurality of power regulators that each provide a respective regulated electrical output from the power input and which are controlled by the control circuit, and wherein at least one of the plurality of power regulators is a mixed mode regulator that is configurable to regulate its regulated electrical output in at least two modes based on a control input from the control circuit provided to the mixed mode regulator; and a toggle input configured to receive a toggle signal from a toggle sensor that senses a user input, wherein the control circuit is configured to temporarily toggle the regulated electrical output of one of the plurality of power regulators from a preferred setting to a preselected output in response to the toggle signal, and wherein the control circuit is further configured to revert the regulated electrical output of one of the one of the plurality of power regulators from the preselected output to the preferred setting upon another toggle signal, and the control circuit is further configured to revert the regulated electrical output of one of the one of the plurality of power regulators from the preselected output to the preferred setting upon expiration of a time out period if the toggle signal is not again changed before expiration of the timeout period;

wherein the preferred setting is based on a schedule of a profile indicating the preferred setting for a time of day, and wherein the preferred setting varies with the time of day.

10. The regulated power controller of claim 9, wherein the toggle signal is a change in a direct current electrical parameter.

11. The regulated power controller of claim 9, wherein the mixed mode regulator is a half bridge DC to DC regulator.

12. The regulated power controller of claim 9, wherein the mixed mode regulator is configurable to regulate its output in both a DC output and a pulse width modulation output, and wherein the DC output is further able to change polarity.

13. The regulated power controller of claim 9, wherein the control circuit controls at least one of the plurality of power regulators to adjust its output in accordance with a circadian rhythm profile over time.

14. A regulated power controller for an environmental control system, comprising:

a power input for receiving electrical power input from a power source;

a control circuit;

a plurality of power regulators that each provide a respective regulated electrical output to a respective one of a plurality of environmental control components from the power input and which are controlled by the control circuit;

wherein the control circuit is configured to control an output of at least one of the plurality of power regulators to provide a preferred setting according to a scheduled profile that varies over time;

a toggle input coupled to the control circuit configured to receive a toggle signal from a user-operated toggle sensor, wherein the control circuit is configured to toggle the regulated electrical output of the at least one of the plurality of power regulators from a preferred setting according to the scheduled profile, and a preselected output in response to receiving the toggle signal, and wherein the control circuit is further configured to revert the regulated electrical output of the one of the plurality of power regulators from the preselected output to the preferred setting upon another toggle signal, and the control circuit is further configured to revert the regulated electrical output of the one of the plurality of power regulators from the preselected output to the preferred setting upon expiration of a time out period if the toggle signal is not again changed before expiration of the timeout period.

15. The regulated power controller of claim 14, wherein the at least one power regulator is a mixed mode half bridge DC to DC regulator.

16. The regulated power controller of claim 14, wherein the at least one power regulator is a mixed mode regulator that is configurable to regulate its output in both a DC output and a pulse width modulation output, and wherein the DC output is further able to change polarity.

17. The regulated power controller of claim 14, wherein the control circuit controls the at least one of the plurality of power regulators to adjust its output over time in correspondence with time of day and a circadian rhythm profile.

* * * * *